(12) United States Patent
Grigorescu

(10) Patent No.: US 12,105,513 B2
(45) Date of Patent: Oct. 1, 2024

(54) DEEP LEARNING BASED MOTION CONTROL OF A GROUP OF AUTONOMOUS VEHICLES

(71) Applicant: Elektrobit Automotive GmbH, Erlangen (DE)

(72) Inventor: Sorin Mihai Grigorescu, Schwalbach a. Ts. (DE)

(73) Assignee: ELEKTROBIT AUTOMOTIVE GMBH, Erlangen (DE)

( * ) Notice: Subject to any disclaimer, the term of this patent is extended or adjusted under 35 U.S.C. 154(b) by 276 days.

(21) Appl. No.: 17/106,436

(22) Filed: Nov. 30, 2020

(65) Prior Publication Data

US 2021/0171024 A1 Jun. 10, 2021

(30) Foreign Application Priority Data

Dec. 6, 2019 (EP) .................................... 19465591

(51) Int. Cl.
*G05D 1/00* (2024.01)
*B60W 30/095* (2012.01)
(Continued)

(52) U.S. Cl.
CPC ......... *G05D 1/0221* (2013.01); *B60W 30/095* (2013.01); *B60W 60/0011* (2020.02);
(Continued)

(58) Field of Classification Search
CPC ........... B60W 30/095; B60W 60/0011; B60W 60/0027; G06K 9/6256; G06N 3/049; G06N 3/08; G06N 3/006; G06N 3/0445; G06N 3/084; G05D 1/0289; G05D 1/0221; G08G 1/164; H04L 41/0893; H04L 45/46; H04L 67/2866
See application file for complete search history.

(56) References Cited

U.S. PATENT DOCUMENTS 10,254,759 B1 * 4/2019 Faust .................... B60W 30/00
2006/0293856 A1 * 12/2006 Foessel ................. B60W 30/09
701/301
(Continued)

OTHER PUBLICATIONS

A Traffic Prediction Enabled Double Rewarded Value Iteration Network for Route Planning (Year: 2019).*
(Continued)

*Primary Examiner* — Thomas Ingram
*Assistant Examiner* — Faris Asim Shaikh
(74) *Attorney, Agent, or Firm* — Cozen O'Connor

(57) ABSTRACT

A controller for an agent of a group of agents, in particular for a group of autonomous or semi-autonomous vehicles, and to a computer program implementing such a controller. A temporal deep network for such a controller and to a method, a computer program and an apparatus for training the temporal deep network. The controller includes a temporal deep network designed to calculate a desired trajectory for the agent, a nonlinear model predictive controller designed to calculate commands for the agent based on the desired trajectory and desired trajectories of the other agents
(Continued)

of the group of agents, and an augmented memory designed to integrate historic system states of the group of agents for the temporal deep network.

18 Claims, 4 Drawing Sheets

(51) Int. Cl.
*B60W 60/00* (2020.01)
*G06F 18/214* (2023.01)
*G06N 3/049* (2023.01)
*G06N 3/08* (2023.01)

(52) U.S. Cl.
CPC ....... *B60W 60/0027* (2020.02); *G06F 18/214* (2023.01); *G06N 3/049* (2013.01); *G06N 3/08* (2013.01)

(56) References Cited

U.S. PATENT DOCUMENTS

| | | | | |
|---|---|---|---|---|
| 2015/0284010 | A1* | 10/2015 | Beardsley | G08G 1/096816 701/1 |
| 2018/0151070 | A1* | 5/2018 | Katou | H04W 4/44 |
| 2019/0012574 | A1* | 1/2019 | Anthony | B60W 30/00 |
| 2019/0061771 | A1* | 2/2019 | Bier | B60W 50/0097 |
| 2019/0072959 | A1* | 3/2019 | Palanisamy | G05D 1/021 |
| 2019/0317510 | A1* | 10/2019 | Ros Sanchez | G05D 1/0214 |
| 2019/0332109 | A1* | 10/2019 | Kolouri | B60W 40/09 |
| 2019/0354836 | A1* | 11/2019 | Shah | G06N 3/045 |
| 2019/0378041 | A1* | 12/2019 | Dhansri | G06N 7/01 |
| 2020/0117958 | A1* | 4/2020 | Brown | G06V 10/454 |
| 2020/0139973 | A1* | 5/2020 | Palanisamy | G06N 3/045 |
| 2020/0174490 | A1* | 6/2020 | Ogale | G06N 3/084 |
| 2020/0180647 | A1* | 6/2020 | Anthony | B60W 60/0015 |
| 2020/0283016 | A1* | 9/2020 | Blaiotta | B60W 60/0011 |
| 2020/0324794 | A1* | 10/2020 | Ma | B60W 60/00272 |
| 2020/0363800 | A1* | 11/2020 | Jojo-Verge | B60W 60/0011 |
| 2020/0377085 | A1* | 12/2020 | Floyd-Jones | B60W 30/09 |
| 2020/0379461 | A1* | 12/2020 | Singh | G06N 3/088 |
| 2021/0012100 | A1* | 1/2021 | Hoffmann | G06N 3/044 |
| 2021/0089867 | A1* | 3/2021 | Byeon | G06N 3/044 |
| 2021/0096576 | A1* | 4/2021 | Grigorescu | G05D 1/0221 |
| 2021/0146964 | A1* | 5/2021 | Rus | B60W 60/0015 |
| 2021/0155266 | A1* | 5/2021 | Sun | G05D 1/0221 |
| 2021/0165375 | A1* | 6/2021 | Zhao | G05B 13/048 |
| 2022/0126864 | A1* | 4/2022 | Moustafa | B60W 30/182 |
| 2022/0332350 | A1* | 10/2022 | Jha | B60W 60/0017 |
| 2023/0141655 | A1* | 5/2023 | Gonzalez | G06N 3/086 706/13 |

OTHER PUBLICATIONS

Steffi Knorn et al. "Overview: Collective Control of Multi-Agent Systems".
Mark Pfeiffer, et al "Predicting Actions to Act Predictably: Cooperative Partial Motion Planning with Maximum Entropy Models".
Yongsoon Yoon, et al. "Model-Predictive Active Steering And Obstacle Avoidance For Autonomous Ground Vehicles", Jan. 15, 2009.
Anthony Stentz "The Focussed D* Algorithm for Real-Time Replanning".
Maxim Likhachev "Anytime Dynamic A*: An Anytime, Replanning Algorithm".
Henrik Kretzschmar, et al. "Socially Compliant Mobile Robot Navigation Via Inverse Reinforcement Learning".
Brian Paden, et al. "A Survey of Motion Planning and Control Techniques for Self-Driving Urban Vehicles", Apr. 25, 2016.
Carlos Carbone, et al. "Swarm Robotics as a Solution to Crops Inspection for Precision Agriculture", Feb. 4, 2018.
Vishnu R. Desaraju, et al. "Decentralized Path Planning for Multi-Agent Teams in Complex Environments Using Rapidly-Exploring Random Trees".
Tom Schouwenaars, et al. "Mixed Integer Programming For Multi-Vehicle Path Planning".
Sepp Hochreiter, et al. "Long Short-Term Memory".
Mnih et. al. "Human-Level Control Through Deep Reinforcement Learning".
Pieter Abbeel et al. "Apprenticeship Learning via Inverse Reinforcement Learning".
Alex Krizhevsky, et. al. "ImageNet Classification with Deep Convolutional Neural Networks".
Gregory Kahn, et al. "Composable Action-Conditioned Predictors: Flexible Off-Policy Learning for Robot Navigation".
Shai Shalev-Shwartz, et al. "Safe, Multi-Agent, Reinforcement Learning for Autonomous Driving".
Michal Cáp et al. "Multi-Agent RRT*: Sampling-Based Cooperative Pathfinding". Feb. 12, 2013.
Rainer Krenn, et al. "Model Predictive Traction and Steering Control of Planetary Rovers".
Mark W. Mueller et al, "A Model Predictive Controller For Quadrocopter State Interception", Jul. 17, 2013.
Fiorato, Nicola et al. "A LSTM Neutral Network Applied to Mobile Robots Path Planning".
Marcin Andrychowicz et. al. "Learning Dexterous In-Hand Manipulation", Aug. 28, 2018.
Shixiang Gu, et al. "Deep Reinforcement Learning for Robotic Manipulation with Asynchronous Off-Policy Updates" Nov. 23, 2016.
Sergey Levine, et al "Learning Hand-Eye Coordination For Robotic Grasping with Deep Learning and Large Scale Data Collection". Aug. 28, 2016.
R. Fletcher, "Practical Methods of Optimization", 2nd ed., John Wiley & Sons, 1987.
Fiorato et al. "A LSTM Neutral Network Applied to Mobile Robots Path Planning", Jul. 18, 2018, pp. 349-354.
Office Action dated Sep. 14, 2022 issued in European Patent Application No. 19465591.6.

* cited by examiner

DEEP LEARNING BASED MOTION CONTROL OF A GROUP OF AUTONOMOUS VEHICLES

BACKGROUND OF INVENTION

1. Field of the Invention

The present invention is related to a controller for an agent of a group of agents, in particular for a group of autonomous or semi-autonomous vehicles, and to a computer program implementing such a controller. The invention is further related to a temporal deep network for such a controller and to a method, a computer program and an apparatus for training the temporal deep network.

2. Description of Related Art

A multi-agent system refers to a group, or swarm, of autonomous systems or robots operating in a networked environment. Calculating collision-free trajectories in multi-agent autonomous vehicles is a safety-critical task. This is valid not only for cooperative robotic systems used for inspection or warehouse management, but also for self-driving cars.

Controlling a single robot is traditionally performed in the "sense-plan-act" paradigm. The working environment is discretized in a virtual space used by a path planner to calculate the path of the robot. The obtained path represents input to an underling motion controller of the robot. Such a system can be viewed as a modular pipeline, where the output of each component represents input to the following module. The path planner computes a least-cost path through the discretized space using A*- or Dijkstra-methods. Extensions of these well-established path planning algorithms to multi-agent systems have been proposed. For example, MA-RRT* and DMA-RRT are based on a combination of A* grid search and sampling-based rapidly exploring random trees (RRT). However, such algorithms are computationally inefficient, require simplifying assumptions, such as environment sparsity, and do not take into account the dynamics of the agents.

The control of multi-agent systems can be formulated as an optimization procedure. Mixed integer linear programming (MILP) is one of the first methods designed in this sense. Due to its computational costs, MILP is restricted to applications involving a small number of agents and an environment with few obstacles.

In recent years, deep learning (DL) has become a leading technology in many domains, enabling autonomous agents to perceive their environment and take actions accordingly. Among different deep learning techniques, deep reinforcement learning (DRL) has been established as one of the leading approaches to control autonomous systems. Deep reinforcement learning is a type of machine learning algorithm, where agents are taught actions by interacting with their environment. In such a system, a policy is a mapping from a state to a distribution over actions. The algorithm does not leverage on training data, but maximizes a cumulative reward, which is positive if the vehicle is able to maintain its direction without collisions, and negative otherwise. The reward is used as a pseudo label for training a deep neural network, which is then used to estimate an action-value function approximating the next best action to take, given the current state. Deep reinforcement learning has mainly been used in controlling single agents, such as robotic cars, or dexterous manipulation of objects. Similar to traditional path planners, the main challenge with deep reinforcement learning on physical systems is that the agent's dynamics are not taken into account.

SUMMARY OF THE INVENTION

It is an object of one aspect of the present invention to provide an improved solution for deep learning based motion control of an agent of a group of agents.

This object is achieved by a controller, by a computer program code, which implements this controller, by a temporal deep network, by a computer program code, which implements this temporal deep network, by a method for training the temporal deep network, by a computer program code, which implements this method, and by an apparatus for training the temporal deep network.

According to a first aspect, a controller for an agent of a group of agents comprises:
- a temporal deep network designed to calculate a desired trajectory for the agent;
- a nonlinear model predictive controller designed to calculate commands for the agent based on the desired trajectory and desired trajectories of the other agents of the group of agents; and
- an augmented memory designed to integrate historic system states of the group of agents for the temporal deep network.

Accordingly, a computer program code comprises instructions, which, when executed by at least one processor, cause the at least one processor to implement a controller according to the invention.

The term computer has to be understood broadly. In particular, it also includes electronic control units, embedded devices, and other processor-based data processing devices.

The computer program code can, for example, be made available for electronic retrieval or stored on a computer-readable storage medium.

According to one aspect, a temporal deep network for a controller for an agent of a group of agents is designed to calculate a desired trajectory for the agent based on historic observations of the agent, a reference trajectory for the agent, and historic states of all agents.

Accordingly, a computer program code comprises instructions, which, when executed by at least one processor, cause the at least one processor to implement a temporal deep network according to one aspect of the invention.

The term computer has to be understood broadly. In particular, it also includes electronic control units, embedded devices, and other processor-based data processing devices.

The computer program code can, for example, be made available for electronic retrieval or stored on a computer-readable storage medium.

A novel approach for planning safe trajectories for a group of agents is described, entitled multi-agent deep learning-based nonlinear model predictive control. The agents are represented as single-track kinematic systems, equipped with state estimators and underlying motion controllers. The environment is modeled as a dynamic system observed by the agents and influenced by their movements. The approach is based on temporal deep neural networks, which estimate optimal desired state trajectories for the agents. The predicted desired trajectories of the agents are fed to respective nonlinear model predictive controllers of the agents, which together can be considered to constitute a distributed nonlinear model predictive controller. The nonlinear model predictive controller of each agent then computes optimal commands transmitted to the underlying motion controller of the agent, subject to motion and actuator constraints.

Model predictive control is a control strategy that computes control actions by solving an optimization problem. It has the ability to handle complex nonlinear systems with state and input constraints. A central idea behind model predictive control is to calculate control actions at each sampling time by minimizing a cost function over a short time horizon, while taking into account observations, input-output constraints and the dynamics of the system given by a process model. Model predictive control has been proven as a reliable control technique for self-driving cars, autonomous mobile robots and unmanned aerial vehicles.

In an advantageous embodiment, the historic system states of the group of agents comprise historic states and observations of the agents. Based on these data the temporal deep network of an agent is able to estimate the desired future trajectory of the agent.

In an advantageous embodiment, the temporal deep network comprises a long short-term memory recurrent neural network. Different from traditional recurrent neural networks, long short-term memories solve recurrent estimation by incorporating three gates, which control the input, output and memory state. They are particularly good in predicting time sequences.

In an advantageous embodiment, the nonlinear model predictive controller is configured to take into account a collision avoidance constraint for each agent. In order for the agents to safely traverse the environment, a collision avoidance constraint is added for each agent, which is preferably modeled as a collision boundary. The boundary can, for example, be represented as a multidimensional agent centered circle.

In an advantageous embodiment, the controller is configured to share the desired trajectory of the agent and observations of the agent with the other agents of the group of agents. This ensures that all agents of the groups of agents are in possession of the data necessary for modeling the environment as a dynamic system observed by the agents and influenced by their movements.

According to yet another aspect, a method for training a temporal deep network according to the invention comprises training the temporal deep network using inverse reinforcement learning based on trajectories acquired from manually driving agents in a test environment.

Similarly, a computer program code comprises instructions, which, when executed by at least one processor, cause the at least one processor to train a temporal deep network according to the invention using inverse reinforcement learning based on trajectories acquired from manually driving agents in a test environment.

Again, the term computer has to be understood broadly. In particular, it also includes workstations, distributed systems and other processor-based data processing devices.

The computer program code can, for example, be made available for electronic retrieval or stored on a computer-readable storage medium.

Accordingly, an apparatus for training a temporal deep network according to the invention comprises a processor configured to train the temporal deep network using inverse reinforcement learning based on trajectories acquired from manually driving agents in a test environment.

The temporal deep neural network is preferably trained in an inverse reinforcement learning setup, with historic data composed of observations and agents' states acquired from manually driving the agents. In this way, demonstrated trajectories are encoded within the layers of the network.

In an advantageous embodiment, parameters of the temporal deep network are learned by minimizing a loss function in a maximum likelihood estimation setup. Advantageously, the training procedure minimizes a custom loss function, which incorporates collision avoidance constraints. The loss function estimates how well the temporal deep network mimics given manual recorded trajectories, while penalizing the collision avoidance constraint.

Advantageously, an autonomous or semi-autonomous vehicle comprises a controller according to the invention. In this way, an improved autonomous driving behavior in different driving scenarios is achieved.

Further features of the present invention will become apparent from the following description and the appended claims in conjunction with the figures.

DETAILED DESCRIPTION OF THE PRESENTLY PREFERRED EMBODIMENTS

Figure 1:
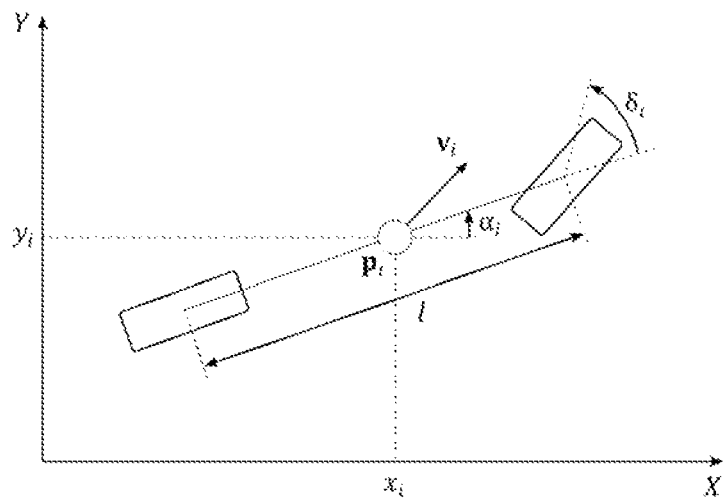
FIG. 1 schematically illustrates the kinematics of the single track model.

The present description illustrates the principles of the present disclosure. It will thus be appreciated that those skilled in the art will be able to devise various arrangements that, although not explicitly described or shown herein, embody the principles of the disclosure.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams presented herein represent conceptual views of illustrative circuitry embodying the principles of the disclosure.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a combination of circuit elements that performs that function or software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

An objective of multi-agent deep learning-based nonlinear model predictive control is to generate collision free trajectories that drive n agents from their current positions to target locations, subject to state and actuator constraints.

The agents are modeled based on a single-track kinematic model in $R^2$, which is shown in FIG. 1. $p_i^{<t>}=(x_i^{<t>}, y_i^{<t>})$ is the center of mass of agent i in the XY ground plane. $v_i^{<t>}=(v_{xi}^{<t>}, v_{yi}^{<t>})$ represents the velocities of agent i along the XY ground plane at discrete time step t. $\alpha_i^{<t>}$ and $\delta_i^{<t>}$ are the heading and steering angles, respectively. The kinematic equations are given as the following non-holonomic constraints:

$$p_i^{<t+1>} = p_i^{<t>} + \Delta t \cdot \begin{bmatrix} \cos \alpha_i^{<t>} \\ \sin \alpha_i^{<t>} \end{bmatrix} \cdot v_i^{<t>}, \quad (1)$$

$$\alpha_i^{<t+1>} = \alpha_i^{<t>} + \frac{v_i^{<t>}}{l} \tan \delta_i^{<t>} \cdot \Delta t, \quad (2)$$

$$v_i^{<x+1>} = v_i^{<t>} + a_i^{<t>} \cdot \Delta t, \quad (3)$$

where velocities and steering angles are the control inputs and $a_i^{<t>}$ is the acceleration of agent i. Each agent is equipped with an underlying motion controller. $\Delta t$ and $l$ are the sampling time and distance between the front and rear wheel, respectively. All agents are considered as identical models, having the same baseline distance 1.

Using the kinematic equations (1) to (3), a nonlinear model to express the states of the agents over a future horizon of fixed length $\tau_o$ can be defined. The kinematic model of agent i can be considered as:

$$z_i^{<t+1>} = f(z_i^{<t>}, u_i^{<t>}) \quad (4)$$

where:

$$z_i^{<t+1>} = z_i^{<t>} + \Delta t \cdot \begin{bmatrix} \cos \alpha_i^{<t>} & 0 \\ \sin \alpha_i^{<t>} & 0 \\ 0 & 1 \end{bmatrix} \cdot u_i^{<t>}, \quad (5)$$

where $z_i^{<t>} \in R^N$ and $u_i^{<t>} \in R^M$. N is the number of state variables, which in the present case is three: position and velocity. M is the number of control inputs, which in the present case is two: velocity command and steering command. The motion of the agents is constrained to limited velocity actuation $u_i^{<t>}$ and steering angle actuation $\delta_i^{<t>}$:

$$u_{min} \leq u_i^{<t>} \leq u_{max}, \quad (6)$$

$$\delta_{min} \leq \delta_i^{<t>} \leq \delta_{max}. \quad (7)$$

In order for the agents to safely traverse the environment, a collision avoidance constraint is added for each agent, modeled as a collision boundary. The boundary is represented as a multidimensional agent centered circle. The collision constraint between agents i and j is defined based on a scaling matrix A:

$$\|\Lambda^{-1} \cdot D_{ij}^{<t>}\|_{d=2} \geq r_{min}, \quad (8)$$

where d is the degree of freedom of the circle, $r_{min}$ is the minimum distance between the agents in the XY plane and $D^{<t>}$ is a distance matrix:

$$D^{<t>} = \|p_i^{<t>} - p_j^{<t>}\|_{L2}, \quad (9)$$

In the present implementation, the minimum distance $r_{min}$ is defined based on the unit circle, thus making the scaling matrix A equal to the identity matrix, $\Lambda = I_4$. L2 is the Euclidean norm.

The above problem can be formalized as a model predictive control optimization problem. When dealing with a single agent, a central idea behind model predictive control is to calculate control actions over a short time horizon by minimizing a cost function, while taking into account observations, input-output constraints and the agent's dynamics given by a process model. The first control action is applied to the agent, after which the resulting state is measured and considered as input to the next optimization iteration.

Figure 2:
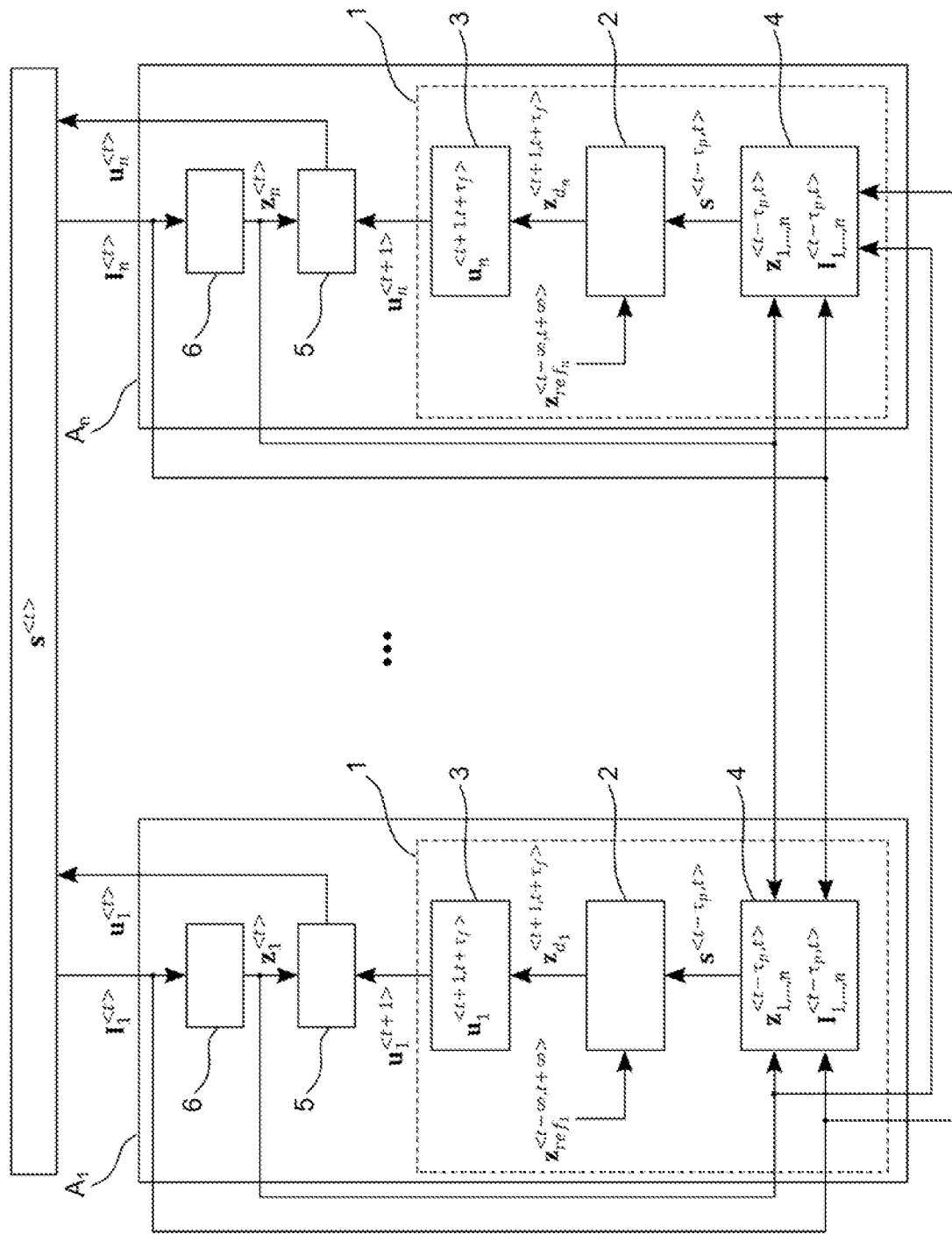
FIG. 2 is a schematic of multi-agent deep learning-based nonlinear model predictive control.

The schematic of multi-agent deep learning-based nonlinear model predictive control is shown in FIG. 2. In the figure, two agents $A_n$ with their respective controllers 1 are depicted. The dynamic state of the system is represented as a collection of variables describing the environment and the state of each agent $A_n$:

$$s^{<t>} = [(I_1^{<t>}, z_1^{<t>}), \ldots, (I_n^{<t>}, z_n^{<t>})] \quad (10)$$

$$= (I_{1,\ldots,n}^{<t>}, z_{1,\ldots,n}^{<t>}),$$

where n is the number of agents $A_n$, $I_i^{<t>}$ denotes the observations of agent i and $z_i^{<t>}$ is the state of agent i, given by its position, heading and velocity at sampling time t:

$$z_i^{<t>} = (p_i^{<t>}, a_i^{<t>}, v_i^{<t>}). \quad (11)$$

The present approach is based on a distributed nonlinear model predictive control, where the agents $A_n$ share their previous observations $I_{1,\ldots,n}^{<t-\tau_p,t>}$ and estimated kstates $z_{1,\ldots,n}^{<t-\tau_p,t>}$, which are provided by respective state estimators 6, before simultaneously solving the next optimization problem. The output of multi-agent deep learning-based nonlinear model predictive control is a set of sequences $u_{1,\ldots,n}^{<t+1,t+\tau_f,t>}$, where $u_i^{<t+1,t+\tau_f>}$ represents the optimal control actions for agent i over a time horizon $\tau_f \cdot \tau_p$, and $\tau_f$ are past and future temporal horizons, which are not necessarily equal.

The historic states $s^{<t-\tau_p,t>}$ are integrated along time interval [t−$\tau_p$, t] by a so-called augmented memory component 4. $s^{<t-\tau_p,t>}$ and a set of reference trajectories $z_{ref_{1,\ldots,n}}^{<t-\infty,t+\infty>}$ are used to train a set of temporal deep networks 2. The deep networks 2 act as nonlinear function approximators for the automatic estimation of the desired future states $z_{d_{1,\ldots,n}}^{<t+1,t+\tau_f>}$ of all agents. The reference trajectories can be calculated off-line, based on a static map of the environment. Since $z_{ref}^{<\cdot>}$ describes an agent's trajectory from start to destination, it can hypothetically be considered to vary in time interval [−∞, +∞]. Multi-agent deep learning-based nonlinear model predictive control provides the means to adapt the motion dynamics of the agents $A_n$ based on the constraints given in equation (8).

The future desired states $z_{d_{1,\ldots,n}}^{<t+1,t+\tau_f>}$ are required as input by the nonlinear model predictive controllers 3 for calculating future control actions. The output of an optimization iteration within multi-agent deep learning-based nonlinear model predictive control is a sequence of control actions for all agents $A_n$: $u_{1,\ldots,n}^{<t+1,t+\tau_f>}$, out of which only $[u_1^{<t+1>}, \ldots, u_n^{<t+1>}]$ will be applied to the underlying motion controllers 5 of the agents $A_n$ at the next time step, respectively.

Figure 3:
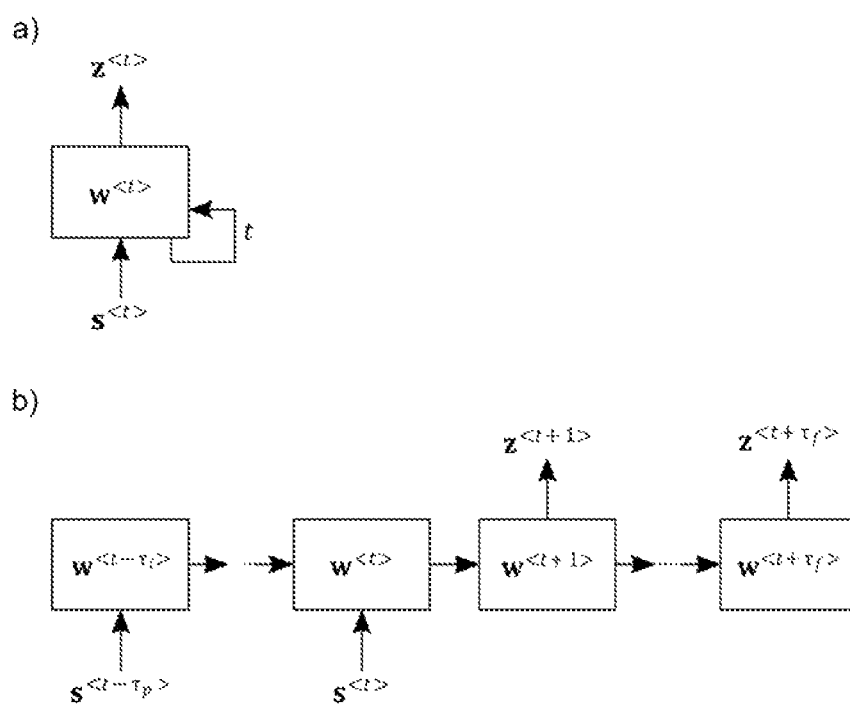
FIG. 3 schematically illustrates a recurrent neural network.

Over the course of the last couple of years, deep learning has been established as the main technology behind many innovations, showing significant improvements in computer vision, robotics and natural language processing. Among the deep learning techniques, recurrent neural networks are especially good in processing temporal sequence data, such as text or video streams. Different from conventional neural networks, a recurrent neural network contains a time dependent feedback loop in its memory cell. Given a time dependent input sequence $[s^{<t-\tau_p>}, \ldots, s^{<t>}]$ and an output sequence $[z^{<t+1>}, \ldots, z^{<t+\tau_f>}]$, a recurrent neural network can be unfolded $\tau_p + \tau_f$ times to generate a loop-less network architecture matching the input length, as illustrated in FIG. 3. In the figure, FIG. 3a) shows a folded recurrent neural network, whereas FIG. 3b) shows the corresponding unfolded recurrent neural network. t represents a temporal index, while $\tau_p$ and $\tau_f$ are the lengths of the input and output sequences, respectively. Over time t, both the input $s^{<t-\tau_p,t>}$ and output $z^{<t+1,t+\tau_f>}$ sequences share the same weights $w^{<\cdot>}$. An unfolded network thus has $\tau_p + \tau_f + 1$ identical layers, i.e. each layer shares the same learned weights $w^{<\cdot>}$. Once unfolded, a recurrent neural network can be trained using the backpropagation through time algorithm. When compared to a conventional neural network, the only difference is that the learned weights in each unfolded copy of the network are averaged, thus enabling the network to share the same weights over time.

In the present implementation, a set of long short-term memory networks is used as nonlinear function approximators for estimating temporal dependencies in dynamic system states sequences. As opposed to traditional recurrent neural networks, long short-term memories solve recurrent estimation by incorporating three gates, which control the input, output and memory state.

A long short-term memory network Q is parametrized by $\Theta = [W_i, U_i, b_i]$, where $W_i$ represents the weights of the network's gates and memory cells multiplied with the input state, $U_i$ are the weights governing the activations, and $b_i$ denotes the set of neuron bias values.

In a supervised learning setup, given a set of training sequences $$D = [(s_1^{<t-\tau_p,t>}, z_1^{<t+1,t+\tau_f>}), \ldots, (s_q^{<t-\tau_p,t>}, z_q^{<t+1,t+\tau_f>})], \quad (12)$$

where q is the number of independent pairs of observed sequences with assignments $z^{<t,t+\tau_f>}$, one can train the response of a long short-term memory network $Q(\cdot;\Theta)$ using maximum likelihood estimation:

$$\hat{\Theta} = \underset{\Theta}{\operatorname{argmax}} \mathcal{L}(\Theta; D) = \underset{\Theta}{\operatorname{argmin}} \sum_{i=1}^{m} l_i \Big( Q\Big(s_i^{<t-\tau_p,t>}; \Theta\Big), z_i^{<t+1,t+\tau_f>} \Big) \quad (13)$$

$$= \underset{\Theta}{\operatorname{argmin}} \sum_{i=1}^{m} \sum_{t=1}^{\tau_f} l_i^{<t>} \Big( Q^{<t>}\Big(s_i^{<t-\tau_p,t>}; \Theta\Big), z_i^{<t>} \Big).$$

where an input sequence of observations $s^{<t-\tau_p,t>} = [s^{<t-\tau_p>}, \ldots, s^{<t-1>}, s^{<t>}]$ is composed of $\tau_p$ consecutive data samples, $l(\cdot,\cdot)$ is the logistic regression loss function, and t represents a temporal index. In the present document, a network output sequence is defined as a desired sate trajectory:

$$z_d^{<t+1,t+\tau_f>} = [z_d^{<t+1>}, z_d^{<t+2>}, \ldots, z_d^{<t+\tau_f>}], \quad (14)$$

where $z_d^{<t+1>}$ is a predicted trajectory set-point at time t+1.

In recurrent neural networks terminology, the optimization procedure in equation (13) is typically used for training "many-to-many" recurrent neural network architectures, where the input and output states are represented by temporal sequences of $\tau_p$ and $\tau_f$ data instances, respectively. This optimization problem is commonly solved using gradient based methods, like stochastic gradient descent (SGD), together with the backpropagation through time algorithm for calculating the network's gradients.

Given a set of agents, a sequence of temporal dynamic environment states $s^{<t-\tau_p,t>}$, and a set of reference trajectories $z_{ref_{1,\ldots,n}}^{<t-\infty,t+\infty>}$, the task is to learn a set of desired trajectory policies for all agents for navigating from state $s^{<t>}$ to the destination state $s_{dest}^{<t+\tau_f>}$.

Figure 4:
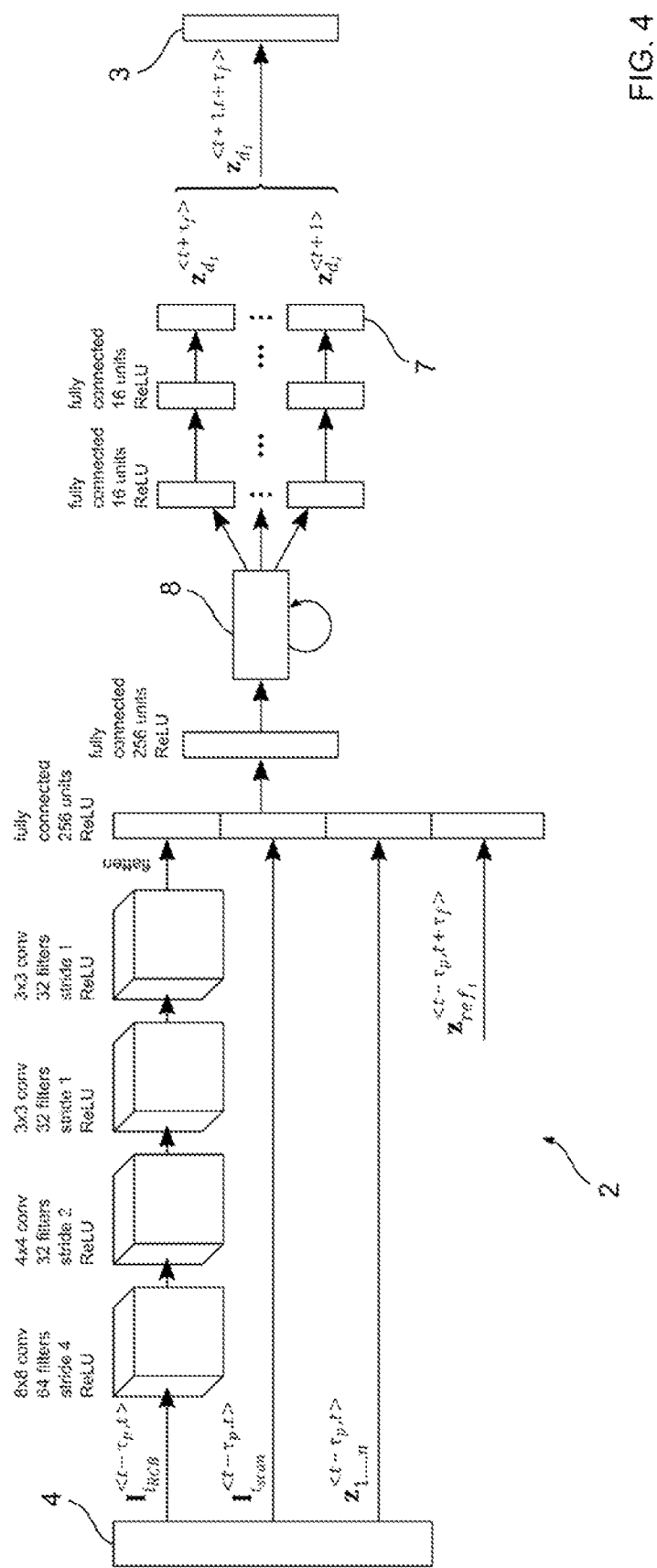
FIG. 4 schematically illustrates use of a temporal deep neural network for prediction of desired trajectories.

The trajectory policy of agent i is encoded within the layers of the temporal deep network 2 of FIG. 4. The network receives as input RGB images $I_{iRGB}^{<t-\tau_p,t>}$ from a camera of the agent, ultrasonic scan data $I_{i_{scan}}^{<t-\tau_p,t>}$, and the historic states of all agents $z_{1,\ldots,n}^{<t-\tau_p,t>}$ from the augmented memory 4, as well as the reference trajectory $z_{ref_i}^{<t-\tau_p,t+\tau_f>}$, bounded to the past and future time horizon interval [t−$\tau_p$, t+$\tau_f$].

The RGB data is firstly processed by a set of convolutional filters, before its concatenation on top of the ultrasonic scan and trajectory state information. The predicted desired trajectory $z_{d_i}^{<t+1,t+\tau_f>}$ of agent i is calculated by a long short-term memory recurrent neural network 8 and fed to a nonlinear model predictive controller 3 via an output layer 7 for calculating the optimal commands of the vehicle.

The deep network 2 is trained based on the inverse reinforcement learning (IRL) principle. In classical reinforcement learning, an agent is taught actions through a cumulative reward, which describes how well the agent did performed its task, based on environment observations and its past actions. The goal here is to maximize the cumulative reward function. In inverse reinforcement learning the direction is reversed, meaning that the agent does not explicitly receive a reward for its actions. Instead, it tries to learn the reward function from expert demonstrations.

In the present work, trajectories acquired from manually driving the agents in the test environment are used as training examples. Within the layers of a temporal deep neural network an optimal action-value function $Q_i^*(\cdot,\cdot)$ is encoded, which estimates the maximal future discounted reward for agent i when starting in state $s^{<t>}$ and performing the distributed nonlinear model predictive control actions $u_{1,\ldots,n}^{<t+1,t+\tau_f>}$, given a set of estimated desired trajectories $z_{d_{1,\ldots,n}}^{<t+1,t+\tau_f>}$:

$$Q^*(s, z_d) = \max_\pi \mathbb{E}\left[R^{<i>} \mid s^{<i>} = s, z_{d_{1,\ldots,n}}^{<t+1,t+\tau_f>} = z_d, \pi\right]. \quad (15)$$

where $R^{<\cdot>}$ is the predicted future reward. $\pi$ denotes the trajectories policy, which is a probability density function over a set of possible actions that can take place in a given state. The optimal action-value function $Q_i^*(\cdot,\cdot)$ maps a given state to the optimal behavior policy of agent i in any state:

In the context of equation 15, a loss function is defined, which estimates how well the temporal deep network mimics given manual recorded trajectories, while penalizing the collision avoidance constraint in equation 9:

$$l(Q(s,z_d;\Theta),z_d) = (z_d - Q(s,z_d;\Theta))^2 + D^T AD, \quad (16)$$

where A is a positive semidefinite diagonal matrix, which weights the inter-agents distance penalty.

The deep network's parameters are learned by minimizing the loss function of equation (16) in the maximum likelihood estimation setup of equation (13):

$$\Theta^* = \underset{\Theta}{\operatorname{argmin}} l(Q(s, z_d; \Theta), z_d). \quad (17)$$

The deep network of FIG. 4 is trained only once and then applied for all agents.

On top of the temporal deep networks' predictions of future desired states, the cost function is defined to be optimized by the distributed nonlinear model predictive control in the discrete time interval [t+1, t+τ₀] as:

$$J_i(z_i,u_i) = (z_{d_i} - z_i)^T Q (z_{d_i} - z_i) + u_i^T R u_i, \quad (18)$$

where i represents the i-th agent, $Q \in \mathbb{R}^{\tau_f N \times \tau_f N}$ is positive semi-definite, $R \in \mathbb{R}^{\tau_f M \times \tau_f M}$ is positive definite, $z_{d_i} = z_{d_i}^{<t+1,t+\tau_f>} = [z_{d_i}^{<t+1>}, \ldots, z_{d_i}^{<t+\tau_f>}]$ is a sequence of desired states estimated by the deep network, $z_i = z_i^{<t+1,t+\tau_f>} = [z_i^{<t+1>}, \ldots, z_i^{<t+\tau_f>}]$ is the sequence of predicted states, and $u_i^{<t,t+\tau_f-1>} = [u_i^{<t>}, \ldots, u_i^{<t+\tau_f-1>}]$ is the control input sequence. R weights the penalty on the control effort.

The objective of distributed nonlinear model predictive control is to find a set of control actions which optimize the agent's behavior over a given time horizon $\tau_f$, while satisfying a set of hard and/or soft constraints:

$$\left(z_{opt_i}^{<t+1>}, u_{opt_i}^{<t+1>}\right) = \underset{z_i, u_i}{\operatorname{argmin}} J\left(z_i^{<t+1,t+\tau_f>}, u_i^{<t+1,t+\tau_f>}\right) \quad (19)$$

$$= \text{such that } z_i^{<0>} = z_i^{<t>}$$

$$= z_i^{<t+k+1>} = f(z_i^{<t>}, u_i^{<t>}),$$

$$= e_{min}^{<t+k>} \le e_i^{<t+k>} \le e_{max}^{<t+k>},$$

$$= u_{min}^{<t+k>} \le u_i^{<t+k>} \le u_{max}^{<t+k>},$$

$$= \dot{u}_{min}^{<t+k>} \le \frac{u_i^{<t+k>} - u_i^{<t+k-1>}}{\Delta t} \le \dot{u}_{max}^{<t+k-1>},$$

where k=0,1, ..., $\tau_f$, $z^{<0>}$ is the initial state and $\Delta t$ is the sampling time of the controller. $e_i^{<t+k>} = z_{d_i}^{<t+k>} - z_i^{<t+1>}$ is the cross-track error, $e_{min}^{<t+k>}$ and $e_{max}^{<t+k>}$ are the lower and upper tracking bounds, respectively. Additionally, $u_{min}^{<t+k>}$, $\dot{u}_{min}^{<t+k>}$ and $u_{max}^{<t+k>}$ and $\dot{u}_{max}^{<t+k>}$ are considered as lower and upper constraint bounds for the actuator and actuator rate of change, respectively. The multi-agent deep learning-based nonlinear model predictive controller implements $$u_i^{<t>} = u_{opt_i}^{<t+1>} \quad (20)$$

at each iteration t.

Use is made of the quadratic cost function of equation (18) and the nonlinear optimization problem described above is solved using the Broyden-Fletcher-Goldfarb-Shanno algorithm. The quadratic form allows applying the quasi-Newton optimization method, without the need to specify the Hessian matrix.

Figure 5:
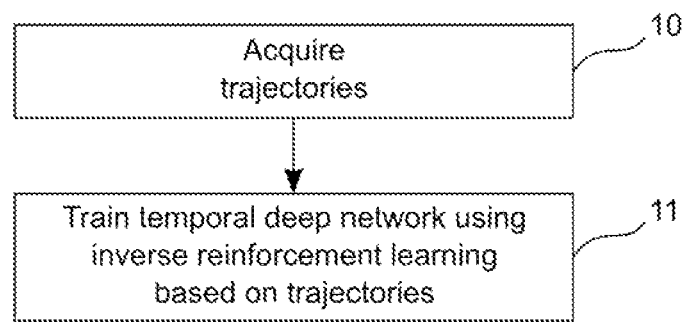
FIG. 5 schematically illustrates a method for training a temporal deep network according to the invention.

FIG. 5 schematically illustrates a method for training a temporal deep network according to the invention. In a first step, trajectories are acquired 10 from manually driving agents in a test environment. The temporal deep network is then trained 11 using inverse reinforcement learning based on the acquired trajectories. During training, parameters of the temporal deep network are preferably learned by minimizing a loss function in a maximum likelihood estimation setup.

Figure 6:
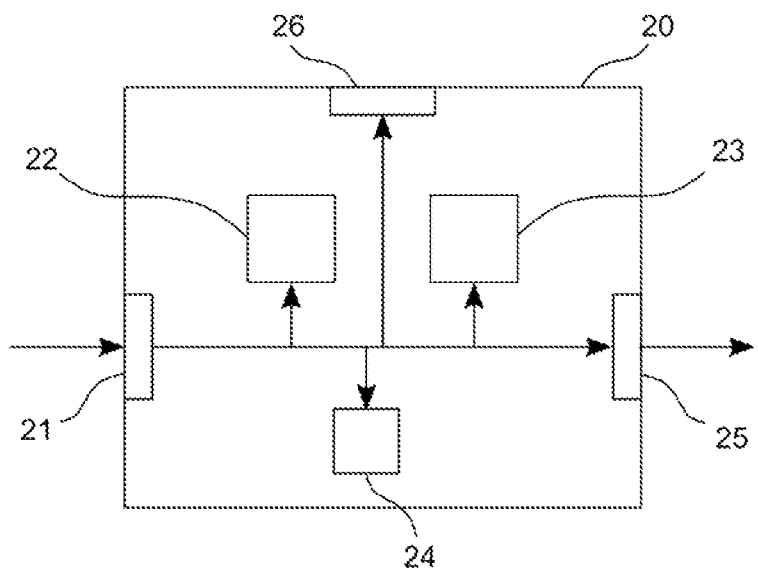
FIG. 6 schematically illustrates a first embodiment of an apparatus for training a temporal deep network according to the invention.

FIG. 6 schematically illustrates a block diagram of a first embodiment of an apparatus 20 for training a temporal deep network according to the invention. The apparatus 20 has an input 21 for receiving data, in particular trajectories acquired from manually driving agents in a test environment. The apparatus 20 further has a processor 22, which is configured to train the temporal deep network using inverse reinforcement learning based on the acquired trajectories. During training, parameters of the temporal deep network are preferably learned by minimizing a loss function in a maximum likelihood estimation setup. Data generated by the processor 22 may be provided for further processing via an output 25. A local storage unit 24 is provided, e.g. for storing data during processing. The output 25 may also be combined with the input 21 into a single bidirectional interface.

The processor 22 may be controlled by a controller 23. A user interface 26 may be provided for enabling a user to modify settings of the processor 22 or the controller 23. The processor 22 and the controller 23 can be embodied as dedicated hardware units. Of course, they may likewise be fully or partially combined into a single unit or implemented as software running on a processor, e.g. a CPU or a GPU.

Figure 7:
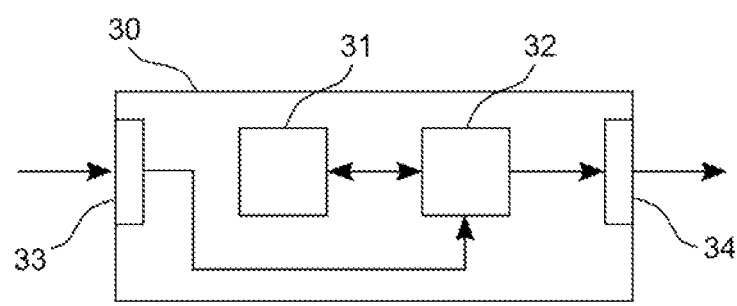
FIG. 7 schematically illustrates a second embodiment of an apparatus for training a temporal deep network according to the invention.

A block diagram of a second embodiment of an apparatus 30 for training a temporal deep network according to one aspect of the invention is illustrated in FIG. 7. The apparatus 30 comprises a processing device 31 and a memory device 32. For example, the apparatus 30 may be a computer, a workstation or a distributed system. The memory device 32 has stored instructions that, when executed by the processing device 31, cause the apparatus 30 to perform steps according to one of the described methods. The instructions stored in the memory device 32 thus tangibly embody a program of instructions executable by the processing device 31 to perform program steps as described herein according to the present principles. The apparatus 30 has an input 33 for receiving data. Data generated by the processing device 31 are made available via an output 34. In addition, such data may be stored in the memory device 32. The input 33 and the output 34 may be combined into a single bidirectional interface.

The processing device 31 as used herein may include one or more processing units, such as microprocessors, digital signal processors, or a combination thereof.

The local storage unit 24 and the memory device 32 may include volatile and/or non-volatile memory regions and storage devices such as hard disk drives, optical drives, and/or solid-state memories.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A controller for an agent ($A_i$) of a group of agents ($A_n$), the controller comprising:
   a temporal deep network configured to calculate a desired trajectory for the agent ($A_i$) based on historic observations of the agent ($A_i$), a reference trajectory for the agent ($A_i$), historic states of all agents ($A_n$), and estimate temporal dependencies in dynamic system states sequences;
   a nonlinear model predictive controller configured to calculate commands for the agent ($A_i$) based at least in part on the desired trajectory and desired trajectories of other agents ($A_n$) of the group of agents ($A_n$);
   an augmented memory configured to integrate historic system states of the group of agents ($A_n$) for the temporal deep network; and
   controlling and operating the agent ($A_i$) according to the calculated commands to maintain the desired trajectory,
   wherein the historic states are used to train the temporal networks of all agents ($A_n$), and
   wherein the controller is configured to consider a collision avoidance constraint for each agent ($A_n$), the collision avoidance constraint is modeled as a collision boundary, which is a multidimensional agent centered circle,
   wherein a loss function is defined, which estimates how well the temporal deep network mimics manual recorded trajectories, while penalizing the collision avoidance constraint.

2. The controller according to claim 1, wherein the historic system states of the group of agents ($A_n$) comprise historic states and observations of the group of agents ($A_n$).

3. The controller according to claim 1, wherein the temporal deep network comprises a long short-term memory recurrent neural network.

4. The controller according to claim 1, wherein the controller is configured to share the desired trajectory of the agent ($A_i$) and observations of the agent ($A_i$) with the other agents ($A_n$) of the group of agents ($A_n$).

5. A temporal deep network for a controller according to claim 1 for an agent ($A_i$) of a group of agents ($A_n$), wherein the temporal deep network is configured to:
   calculate commands to maintain the desired trajectory for control and operation of the agent ($A_i$).

6. The temporal deep network according to claim 5, wherein the temporal deep network comprises a long short-term memory recurrent neural network.

7. The temporal deep network according to claim 5, wherein the temporal deep network is trained based on inverse reinforcement learning.

8. The controller according to claim 1, wherein the desired trajectory minimizes the cost function for the agent.

9. The controller according to claim 1, wherein the calculated commands transmitted to an underlying motion controller of the agent are subject to motion and actuator constraints of the agent.

10. The controller according to claim 1, wherein the calculated commands transmitted comprise at least one of a velocity command and a steering command to actuate respective actuators of the agent to maintain the desired trajectory.

11. The controller according to claim 1, wherein the temporal deep neural network is trained in an inverse reinforcement learning setup, with historic data including observations of the group of agents ($A_n$) to encoded demonstrated trajectories.

12. A computer program code comprising instructions, which, when executed by at least one processor, cause the at least one processor to implement a controller for an agent ($A_i$) of a group of agents ($A_n$), the controller comprising:
   a temporal deep network configured to calculate a desired trajectory for the agent ($A_i$) based on historic observations of the agent ($A_i$), a reference trajectory for the agent ($A_i$), historic states of all agents ($A_n$), and estimate temporal dependencies in dynamic system states sequences;
   a nonlinear model predictive controller configured to calculate commands for the agent ($A_i$) based at least in part on the desired trajectory and desired trajectories of other agents ($A_n$) of the group of agents ($A_n$); and
   an augmented memory configured to integrate historic system states of the group of agents ($A_n$) for the temporal deep network;
   wherein the calculated commands maintain the desired trajectory to control and operate the agent ($A_i$)
   wherein the historic states are used to train the temporal networks of all agents ($A_n$), and
   wherein the controller is configured to consider a collision avoidance constraint for each agent ($A_n$), the collision avoidance constraint is modeled as a collision boundary, which is a multidimensional agent centered circle,
   wherein a loss function is defined, which estimates how well the temporal deep network mimics manual recorded trajectories, while penalizing the collision avoidance constraint.

13. A computer program code comprising instructions, which, when executed by at least one processor, cause the at least one processor to implement a temporal deep network to:
   calculate a desired trajectory for an agent ($A_i$) based at least in part on historic observations of the agent ($A_i$);
   calculate a reference trajectory for the agent ($A_i$); and
   calculate historic states of all agents ($A_n$);
   estimate temporal dependencies in dynamic system states sequences; and
   control and operate the agent ($A_i$) according to the calculated commands to maintain the desired trajectory; and train the temporal networks of all agents ($A_n$) using the historic states, wherein the controller is configured to consider a collision avoidance constraint for each agent ($A_n$), the collision avoidance constraint is modeled as a collision boundary, which is a multidimensional agent centered circle, wherein a loss function is defined, which estimates how well the temporal deep network mimics manual recorded trajectories, while penalizing the collision avoidance constraint.

14. A method for training a temporal deep network, the method comprising:

acquiring trajectories from manually driving agents ($A_n$) in a test environment based on historic observations of the agent ($A_i$) and historic states of all agents ($A_n$); and training the temporal deep network using inverse reinforcement learning based at least in part on trajectories acquired from the manually driving agents ($A_n$) in the test environment to estimate temporal dependencies in dynamic system states sequences;

wherein the temporal deep network controls and operates a respective agent ($A_i$) according to the training to maintain a desired trajectory, wherein the historic states are used to train the temporal networks of all agents ($A_n$), and wherein the controller is configured to consider a collision avoidance constraint for each agent ($A_n$), the collision avoidance constraint is modeled as a collision boundary, which is a multidimensional agent centered circle, wherein a loss function is defined, which estimates how well the temporal deep network mimics manual recorded trajectories, while penalizing the collision avoidance constraint.

15. The method according to claim 14, wherein parameters of the temporal deep network are learned by minimizing the loss function in a maximum likelihood estimation setup.

16. A computer program code comprising instructions, which, when executed by at least one processor, cause the at least one processor to acquire trajectories from manually driving agents ($A_n$) in a test environment based on historic observations of the agent ($A_i$) and historic states of all agents ($A_n$); and train a temporal deep network using inverse reinforcement learning based at least in part on the trajectories acquired from the manually driving agents ($A_n$) in the test environment and estimate temporal dependencies in dynamic system states sequences, wherein the temporal deep network controls and operates a respective agent ($A_i$) according to the training to maintain a desired trajectory, wherein the historic states are used to train the temporal networks of all agents ($A_n$), and wherein the controller is configured to consider a collision avoidance constraint for each agent ($A_n$), the collision avoidance constraint is modeled as a collision boundary, which is a multidimensional agent centered circle, wherein a loss function is defined, which estimates how well the temporal deep network mimics manual recorded trajectories, while penalizing the collision avoidance constraint.

17. An apparatus for training a temporal deep network comprising:

a processor configured to train the temporal deep network using inverse reinforcement learning based on trajectories acquired from manually driving agents ($A_n$) in a test environment based on historic observations of the agent ($A_i$), and historic states of all agents ($A_n$), and estimate temporal dependencies in dynamic system states sequences, wherein the temporal deep network controls and operates a respective agent ($A_i$) according to the training to maintain a desired trajectory, wherein the historic states are used to train the temporal networks of all agents ($A_n$), and wherein the controller is configured to consider a collision avoidance constraint for each agent ($A_n$), the collision avoidance constraint is modeled as a collision boundary, which is a multidimensional agent centered circle, wherein a loss function is defined, which estimates how well the temporal deep network mimics manual recorded trajectories, while penalizing the collision avoidance constraint.

18. An autonomous or semi-autonomous vehicle, characterized in that the autonomous or semi-autonomous vehicle comprises:

a controller comprising:

a temporal deep network configured to calculate a desired trajectory for an agent ($A_i$) based on historic observations of the agent ($A_i$), a reference trajectory for the agent ($A_i$), historic states of all agents ($A_n$), and estimate temporal dependencies in dynamic system states sequences;

a nonlinear model predictive controller configured to calculate commands for the agent ($A_i$) based at least in part on the desired trajectory and desired trajectories of other agents ($A_n$) of a group of agents ($A_n$); and an augmented memory configured to integrate historic system states of the group of agents ($A_n$) for the temporal deep network, wherein the controller control and operate the agent ($A_i$) according to the calculated commands to maintain the desired trajectory, wherein the historic states are used to train the temporal networks of all agents ($A_n$), and wherein the controller is configured to consider a collision avoidance constraint for each agent ($A_n$), the collision avoidance constraint is modeled as a collision boundary, which is a multidimensional agent centered circle, wherein a loss function is defined, which estimates how well the temporal deep network mimics manual recorded trajectories, while penalizing the collision avoidance constraint.

* * * * *